United States Patent [19]

Hudson

[11] 4,155,349

[45] May 22, 1979

[54] VARIABLE INTENSITY WHISTLE

[75] Inventor: Barry L. Hudson, Lower Templestowe, Australia

[73] Assignee: General Electric Company, New York, N.Y.

[21] Appl. No.: 830,813

[22] Filed: Sep. 6, 1977

[30] Foreign Application Priority Data

Aug. 25, 1976 [AU] Australia .............................. PC7134

[51] Int. Cl.² ..................... A47J 27/212; G08B 17/04
[52] U.S. Cl. .................................................. 126/388
[58] Field of Search ..................... 116/70, 112, 137 R; 99/285; 126/388

[56] References Cited

U.S. PATENT DOCUMENTS

| 427,059 | 5/1890 | Dunning | 116/140 |
|---|---|---|---|
| 1,128,242 | 2/1915 | Gillis | 116/70 |
| 1,811,853 | 6/1931 | Landman | 116/140 |
| 2,507,934 | 5/1950 | Reichart | 126/388 |
| 2,536,369 | 1/1951 | Hubbard | 126/388 |
| 3,094,972 | 6/1963 | Leavenworth | 116/137 R X |
| 3,830,191 | 8/1974 | Burke | 116/67 R |
| 3,924,559 | 12/1975 | Renner, Jr. | 116/112 X |

Primary Examiner—Daniel M. Yasich
Attorney, Agent, or Firm—George R. Powers; Leonard J. Platt; John F. Cullen

[57] ABSTRACT

A variable intensity whistle is formed by a cylindrical chamber having apertures in opposite ends. The centers of the apertures are off set with respect to the cylinder axis and the chamber is formed in two parts which are rotatable relative to each other to either align the apertures and displace them by predetermined amounts.

8 Claims, 5 Drawing Figures

VARIABLE INTENSITY WHISTLE

The present invention relates to a gas or vapour operated whistle and in particular to a whistle having a variable intensity.

In many applications such as the whistle which has traditionally been provided on tea kettles to inform a person heating the water in the kettle that the kettle has boiled, it is desirable to provide a variable intensity whistle. Such a whistle enables the intensity, or loudness, of the whistle to be varied in accordance with the requirements of the user. For example, where the user has poor hearing or wishes to undertake an activity at a location distant from the kettle being heated, it is desirable that the intensity of the whistle be high so that a loud noise is created by the whistle and the person is able to hear it. On the other hand where the person using the kettle remains in close proximity to the kettle or has sensitive ears, which find the intensity of the noise produced by conventional whistles irritating, it is desirable that the intensity of the whistle be reduced so that no inconvenience is suffered.

Accordingly it is the object of the present invention to provide a gas or vapour operated whistle which can easily be adjusted to different levels of intensity.

This object is achieved according to the invention by a variable intensity whistle comprising a first member having an aperture therethrough and a second member having an opening therethrough, said first and second members being spaced apart and forming opposing walls of a chamber, the members being arranged for relative movement between them to selectively provide alignment and displacement between said aperture and said opening.

One embodiment of the present invention will now be described in relation to a variable intensity whistle suitable for a domestic tea kettle. However it is to be understood that the invention is not limited to such use since the variable intensity whistle of the present invention may be used in industrial applications and may also be used in relation to gasses and vapours other than steam.

This embodiment of the invention will now be described in detail with reference to the drawings in which.

Figure 1:
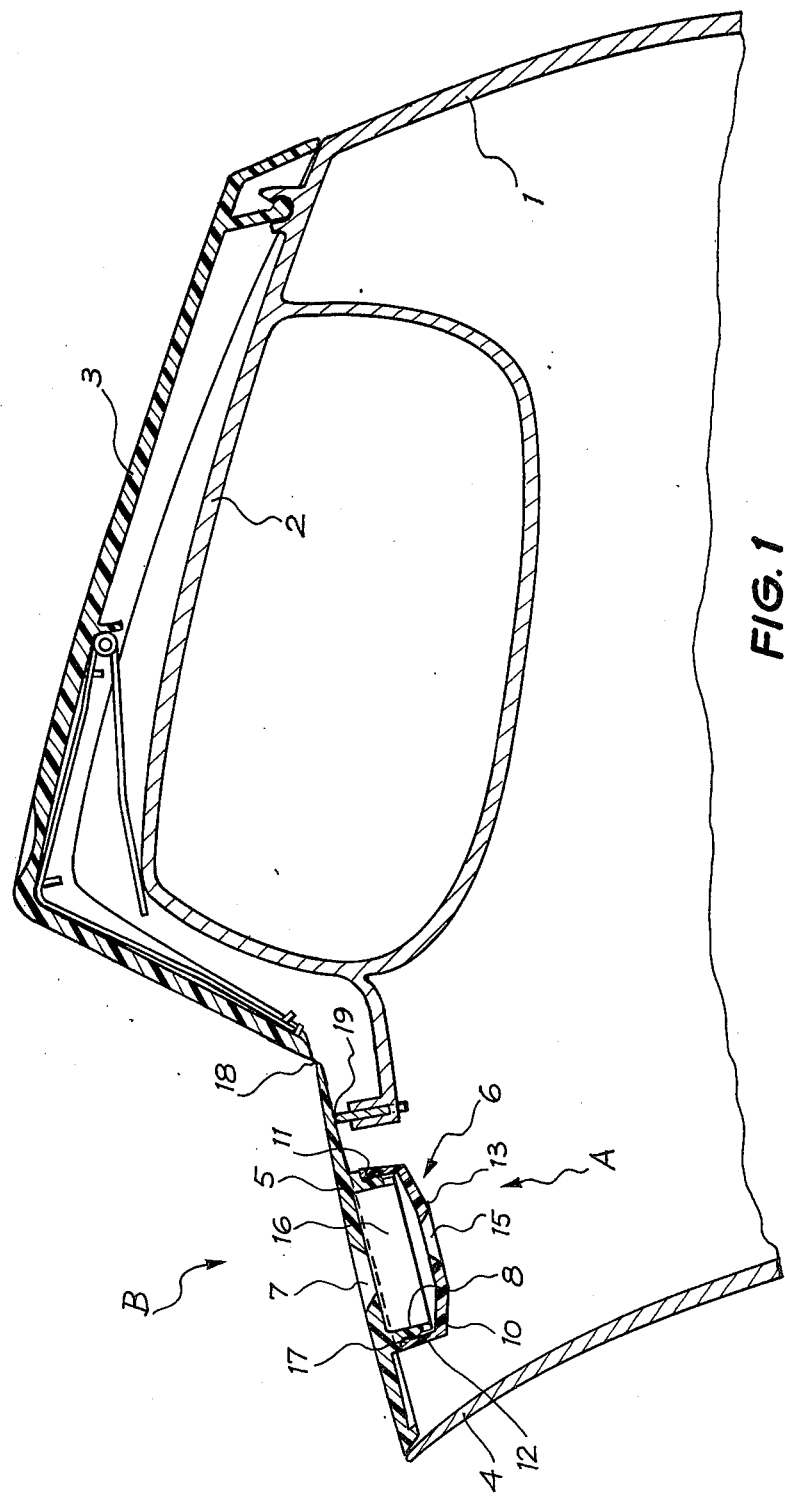
FIG. 1 is a sectional view of the top part of a water kettle incorporating a variable intensity whistle according to the invention.
Figure 2:
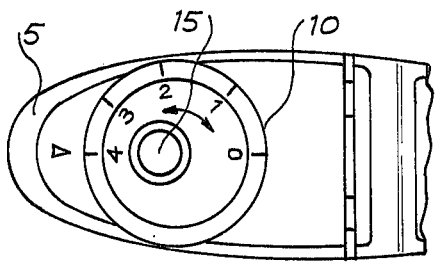
FIG. 2 shows a view of the same variable intensity whistle in the direction of arrow A in FIG. 1.

Referring to FIG. 1 there is shown the top part of a water kettle 1 with a kettle handle 2 in section. An L-shaped handle lever 3 is mounted on the top of the handle 2 and is pivoted at one end on the handle 2 furthest from a pouring spout 4. The other end of the lever 3 is hingedly connected at 18 to one end of a spout cover 5 which forms a base member of a variable intensity whistle 6. The spout cover 5 is movable on fulcrum 19 to permit the kettle to be filled and hot water to be poured from the kettle. When the spout cover 5 is lifted off the spout 4 access is made to the variable intensity whistle 6 which can then be adjusted.

The spout cover 5 includes an aperture 7 located on the longitudinal axis of the spout cover 5. The aperture 7 is perferably circular with a sloping side wall so that the diameter of the aperture 7 at the inwardly facing surface of the spout cover 5 facing the pouring spout 4 is smaller than the diameter of the aperture of the exterior surface of the spout cover 5.

Figure 3:
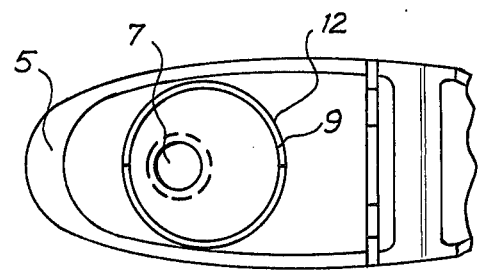
FIG. 3 is the same view as FIG. 2 with the cap part removed.
Figure 4:
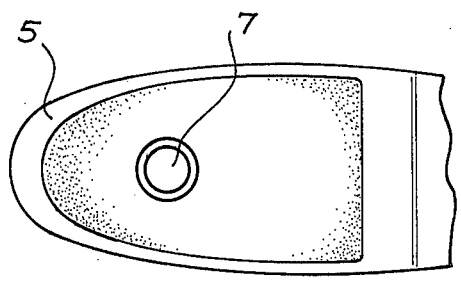
FIG. 4 is a view of the water kettle spout of FIG. 1 in the direction of arrow B.
Figure 5:
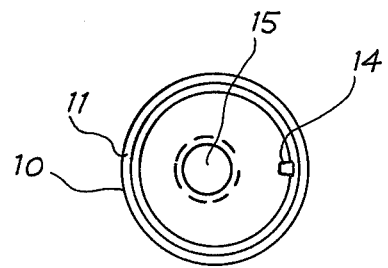
FIG. 5 shows the inside of the whistle cap shown in FIGS. 1 and 2.

The inwardly facing surface of the spout cover 5 has a downwardly extending tubular portion or rim 8 with a peripheral groove 17 which lies in a plane parallel to the plane of the inwardly facing surface of the spout cover 5. The rim 8 is also located on the longitudinal axis of cover 5, but its centre is off-set longitudinally with regard to the centre of the aperture 7. The end of the rim 8 facing the spout 4 is provided with a recess 9, FIG. 3, running through approximately 180 degrees. A cap 10 is rotatably mounted on the rim 8 by means of a bead 11 located at the edge of a skirt 12 of the cap 10 and engaged with the peripheral groove 17 thus forming a chamber 16. In the corner formed by the skirt 12 and the top part 13 of the cap 10 is a stop 14 (FIG. 5) which can move in the recess 9 when the cap is rotated on the rim 8, to permit rotation of the cap through approximately 180 degrees between two predetermined positions designated by marks on the outer surface of the cap 10 and an arrow on the inwardly facing surface of the spout cover 5.

The top part 13 covers the aperture 7 save for an opening 15 in the top part 13 of the cap which is circular having a diameter approximately as big as the diameter of the aperture 7. The opening 15 has a sloping side wall and the smaller diameter of the opening faces the smaller diameter of the aperture 7. The opening 15 is offset relative to the rotation axis of the cap by the same amount as the aperture 7 is offset relative to the axis of the rim 8. Thus in one of the predetermined positions of the cap 10 relative to the base member 5 the aperture 7 and the opening 15 are in complete alignment while in the other of these positions maximum displacement between aperture and opening is achieved. All parts of the variable intensity whistle are made from plastics material such as polypropylene.

The whistling effect is due to the fact that the steam, in escaping through the two aligned holes, sets up symmetrical pressure waves in the chamber 16. In a balanced system the waves reinforce each other and are emitted as concentric shock waves. The better the balance the cleaner the whistle. The balanced system is quite fine and consequently, a controlled inbalance, such as misalignment, will produce a progressive breakdown of the wave reinforcement pattern. It also causes turbulence which further breaks up the wave formation. The result is a hiss and not a whistle. The progression from a whistle to a hiss is commensurate with the amount of offset between the aperture 7 and the opening 15.

The velocity of the escaping steam is substantially the same at displacement as it is at complete alignment. The amount of steam escaping is also substantially the same for both extreme positions of the opening 15 relative to the aperture 7. Thus the cap setting may be selected to provide a whistle sufficiently loud for those persons having poor hearing or working in locations distant from the whistle.

When water in the kettle 1 is heated a head of steam builds up within the kettle 1. When the cap 10 is in the first predetermined position with the aperture 7 and the opening 15 substantially aligned, steam is easily able to escape from the interior of the kettle through both the opening and the aperture thus producing the loudest whistle.

When the cap 10 is in the second predetermined position, the degree of misalignment between the aperture 7 and the opening 15 is sufficient to substantially eliminate any whistle.

In consequence the cap 10 may be turned between two positions the first of which provides a whistle of maximum intensity and the second of which does not provide any audible whistle. As a result the user of the kettle may set the cap to an intermediate position which produces the desired intensity of the whistle.

The pitch of the whistle depends on a number of factors such as the level of water within the kettle, the relative sizes of the aperture and opening, the distance between the aperture and opening and volume of the chamber formed between the cap and the inner surface of the flap. All these variable factors can be taken into consideration when constructing a whistle of convenient dimensions which will produce a suitable maximum intensity whistle of medium pitch for all expected water levels within the kettle.

The foregoing describes only one embodiment of the present invention and modifications, obvious to those skilled in the art, may be made thereto without departing from the scope of the present invention.

I claim:

1. A variable intensity whistle comprising wall means forming a chamber having a fixed axis, said wall means comprising spaced opposing first and second wall members, said first wall member having an aperture therein the axis of which is displaced relative to said axis of said chamber and said second wall member having an opening therein the axis of which is also displaced relative to said axis of said chamber, said first and second wall members being relatively movable with respect to each other to selectively provide axial alignment or displacement between said aperture and said opening so as to alter a fluid path through said chamber and thus vary the intensity of a whistle produced by fluid passing through said aperture and said opening.

2. A variable intensity whistle according to claim 1 wherein the chamber is cylindrical and the axis thereof is longitudinal.

3. A variable intensity whistle according to claim 1 made from a plastic material such as polypropylene.

4. A variable intensity whistle according to claim 1 wherein each of said aperture and said opening is substantially circular and has a sloping side wall such that the diameter thereof is smaller on one side of the respective wall member than on the other side, said aperture and said opening being arranged such that the smaller diameters thereof face each other and the interior of said chamber.

5. A variable intensity whistle comprising a cylindrical chamber closed at one end by a first member having a circular rim thereon projecting toward the other end and closed at said other end by a second member in the shape of a cap fitting over said rim and being rotatable thereon, a circular aperture in said first member and a circular opening in said second member, said aperture and said opening having centers offset from the longitudinal axis of said chamber by substantially equal distances such that said aperture and said opening upon rotation of said cap can be moved into and out of axial alignment with respect to each other so as to alter a fluid path through said chamber and thus vary the intensity of a whistle produced by fluid flowing through said aperture and said opening.

6. A variable intensity whistle according to claim 5 wherein said rim has a circular groove and said cap has an internal bead snapping into said groove, and wherein said rim is provided with a recess therein extending between circumferentially spaced-apart stop means and said cap member is provided with a stop member extending into said recess, rotation of said cap member being limited by engagement between said stop member and said stop means at opposite ends of said recess.

7. In a water kettle, a movable spout cover incorporating a variable intensity whistle, said whistle comprising a cylindrical chamber having one end formed by said spout cover and a second end formed by a cap member, a circular depending rim on said spout cover, said rim having an annular groove, said cap member fitting over said rim and having an internal bead to snap into said groove, a circular aperture in said spout cover and a circular opening in said cap, said aperture and said opening having centers offset from the longitudinal axis of said chamber by substantially equal distances such that said aperture and said opening can by rotation of said cap member be moved into and out of axial alignment with respect to each other so as to alter a fluid path through said chamber and thus vary the intensity of a whistle produced by fluid passing through said aperture and said opening.

8. A variable intensity whistle according to claim 7 made from plastics material such as polypropylene.